Feb. 10, 1953 M. J. QUILLINAN 2,628,025
SLIDE RULE
Filed March 12, 1951

Michael J. Quillinan
INVENTOR.

Patented Feb. 10, 1953

2,628,025

UNITED STATES PATENT OFFICE 2,628,025

SLIDE RULE

Michael J. Quillinan, Bronx, N. Y.

Application March 12, 1951, Serial No. 215,135

8 Claims. (Cl. 235—79.5)

The present invention relates to a new and improved slide rule structure that practically and economically provides a slide rule having automatic adjusting and compensating means, which means promotes more fluid reciprocation of the scaled elements and index of the rule along its length of travel, thereby reducing the adverse effects of the atmosphere, to the increments of which such instruments are so sensitive.

Figure 1:
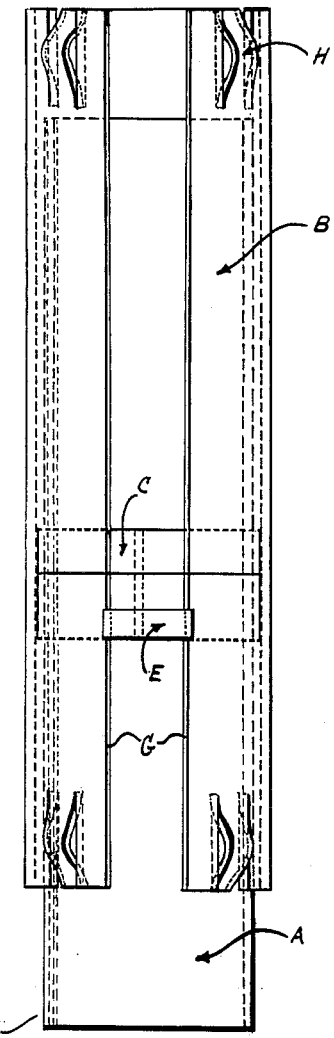
Figure 3:
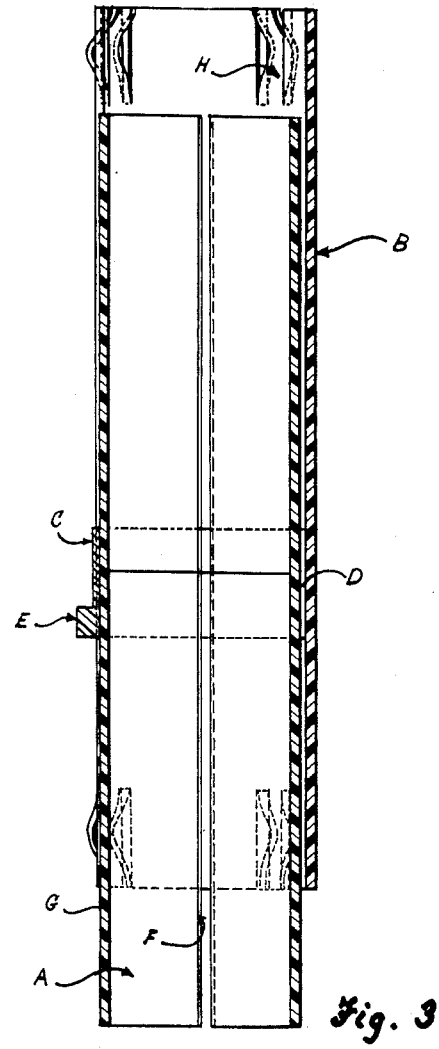
Figure 2:
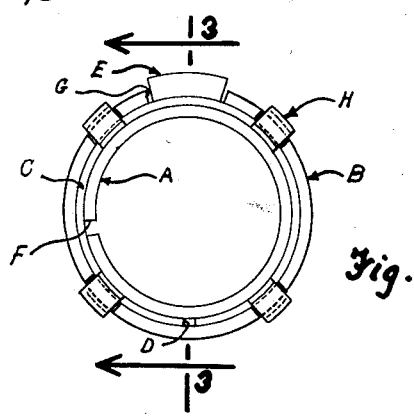

The invention is directed to structure as distinguished from any logarithmic or other such indicia as may be provided thereon. Hence, such indicia is omitted from the drawing, for sake of clarity. In the drawings, Fig. 1 is a lengthwise view of the rule; Figure 2 is an end view of the rule; and Fig. 3 is a longitudinal sectional view taken along line 3—3 in Fig. 2.

A primary object of the invention is to cheaply and practically provide a slide rule that is more fluidly manipulable while having a greater plurality of scale area and ease of transferability of scale functions.

Another object of the invention is to provide in an index and slide combination, automatic adjusting and compensating means which maintain the rule's reciprocating parts in proper alignment and balance throughout the extremes of reciprocation.

A further object of the invention is to provide a slide rule that is economically produced and has a high degree of accuracy and rule readability, said rule having improved fluidity of reciprocation.

The rule consists of cylinders A and B concentrically slideable and coaxial, slide B sliding externally on slide A and having cylindrical index C provided between it and slide B.

The index C is slit as at D and has a positioning knob E extending upward from said index.

The cylindrical slide A is slit along its length, as is cylindrical slide B, at F and G respectively. Both slides are made of an elastic plastic which lends to the slide's resiliency as they are respectively embraced and embrace relative to one another, the slides being interspaced by the thin, sensitive, elastic index C which engages the scaled surfaces of both slides.

The extremities of cylindrical slide B are provided with ribbons H that are elastic and integrally formed on said slide and uniformly disposed thereabout, each ribbon H functioning as a leaf spring and bearing upon slide A.

In fabrication, these ribbons are separated from the body of slide B, as it lies flat, and are later cocked and coiled so as to be in springing engagement with the face of slide A as slide B is itself cylindrically formed. The thermo-setting properties of the plastic from which the slides are made, enable the ribboning operation and cylindrical rolling operation to be executed at the same or separate periods of time. Each ribbon H is initially displaced from the inner cylindrical surface of slide B a substantial amount such that each set of ribbons H at either end of the slide may, when the appropriate end of slide A clears slide B, be elastically engageable with slide A. Thus index C, although separating slides A and B, cooperates with ribbon H to insure that slide A is properly balanced in slide B such that wobbling of the former in the latter is avoided. The ribbons H by maintaining uniform pressure on slide A about the perimeter thereof also insures that slide A reciprocates coaxially with slide B.

The slides furthermore are yieldingly engageable by reason of the inherent elasticity of the plastic material from which they are made as well as the novel relationship that they bear to each other. Friction resulting between reciprocating surfaces is relieved by the permissible increase in circumference of the slit elastic cylinders A and B as well as the index C, ribbons H meanwhile acting to maintain these parts in equilibrium throughout the extremes of reciprocation. Ribbons H at the same time each act as independent springs which absorb the effect of absolute and relative increments of expansion of the rule's reciprocating parts while maintaining coaxially throughout the extremes of reciprocation.

It is to be appreciated that the positions of slides A and B may be interchanged without departing from the spirit of the invention and therefore a broad interpretation of the following group of claims is desired.

Having fully described the invention, I claim:

1. A slide rule having a cylindrical first slide, an index slideable and circumjacent with respect to said first slide, said index slit along a side thereof, said index being resilient, said index evenly engaging said first slide, a second slide circumjacent to said first slide and said index, said second slide slit along the length thereof, said second slide being resilient, said second slide evenly engaging said index, resilient projections provided at the longitudinal extremities of said second slide, said projections offset with respect to the face of said second slide in the direction of said first slide in their unflexed state, said projections adapted to be flexed by engagement with said first slide, said second slide slideable with respect to said first slide.

2. A slide rule according to claim 1 in which said index embraces said first slide, and said second slide embraces said index and said first slide.

3. A slide rule according to claim 1 in which said first slide is slit along the length thereof and resilient.

4. A slide rule having a cylindrical first slide, a resilient index complementary to and engaging a portion of said first slide, a projection on said index, co-axial sides on said projection, a resilient second slide surrounding a majority of said first slide, co-axial longitudinally extending free edges on said second slide, said free edges evenly engaging said sides.

5. A slide rule according to claim 4 in which said index is split from end to end, and said projection is diametrically opposite the slit thereof.

6. A slide rule according to claim 4 in which said first slide is slit and resilient.

7. A slide rule comprising a first slide of cylindrical conformation, a second slide of cylindrical conformation complementary to said first slide, an index of cylindrical conformation deposited between said first and second slides, a slit along the length of said index, a positioning knob on said index opposed to and centrally located with respect to the slit free end portions of said index, said index resiliently embracing said first slide, said second slide slit along the length thereof and resiliently embracing said index, the slit free end portions of said second slide guiding said positioning knob, resilient ribbons on the longitudinal extremities of said second slide, said ribbons offset in the direction of said first slide and adapted to yieldably engage said first slide, said first and second slide adapted to reciprocate coaxially with respect to themselves and said index.

8. A slide rule according to claim 7 in which said first slide is slit along the length thereof.

MICHAEL J. QUILLINAN.

REFERENCES CITED

The following references are of record in the file of this patent:

UNITED STATES PATENTS

| Number | Name | Date |
|---|---|---|
| 2,137,630 | Sinitzin-White | Nov. 22, 1938 |
| 2,511,270 | Kahan | June 13, 1950 |
| 2,530,047 | Dewar | Nov. 14, 1950 |

FOREIGN PATENTS

| Number | Country | Date |
|---|---|---|
| 183,723 | Great Britain | Aug. 3, 1922 |